US008559174B2

(12) United States Patent
Cheng et al.

(10) Patent No.: US 8,559,174 B2
(45) Date of Patent: Oct. 15, 2013

(54) COMPUTER CASE

(75) Inventors: Sheng-Hsiung Cheng, Taipei (TW); Te-An Lin, Taipei (TW); Hung-Chun Huang, Taipei (TW)

(73) Assignee: Aopen Incorporated, Taipei (TW)

( * ) Notice: Subject to any disclaimer, the term of this patent is extended or adjusted under 35 U.S.C. 154(b) by 0 days.

(21) Appl. No.: 13/413,178

(22) Filed: Mar. 6, 2012

(65) Prior Publication Data
US 2013/0234571 A1  Sep. 12, 2013

(51) Int. Cl.
H05K 5/00 (2006.01)
H05K 7/00 (2006.01)
H01J 5/00 (2006.01)

(52) U.S. Cl.
USPC ............... 361/679.6; 174/50; 174/561

(58) Field of Classification Search
USPC ............. 361/679.6; 174/50, 559, 560, 561
See application file for complete search history.

(56) References Cited

U.S. PATENT DOCUMENTS

| 4,672,510 A * | 6/1987 | Castner ............... 361/679.32 |
| 5,121,296 A * | 6/1992 | Hsu ..................... 361/679.39 |
| 5,187,643 A * | 2/1993 | I-Shou ................. 361/679.37 |
| 5,197,789 A * | 3/1993 | Lin ....................... 312/223.2 |
| 5,337,464 A * | 8/1994 | Steffes ..................... 29/401.1 |
| 5,349,483 A * | 9/1994 | Tsai ....................... 360/99.23 |
| 5,398,833 A * | 3/1995 | Klauss et al. .............. 220/4.02 |
| 5,679,924 A * | 10/1997 | Young et al. ................. 174/50 |
| 5,743,606 A * | 4/1998 | Scholder ................... 312/223.2 |
| 5,835,346 A * | 11/1998 | Albani et al. ............. 361/679.4 |
| 5,848,718 A * | 12/1998 | Colwell ..................... 220/4.02 |
| 6,024,426 A * | 2/2000 | Korinsky et al. ........... 312/223.2 |
| 6,257,682 B1 * | 7/2001 | Liu et al. .................. 312/223.2 |
| 6,367,896 B1 * | 4/2002 | Peng et al. ................ 312/223.2 |
| 6,480,398 B1 * | 11/2002 | Fiora et al. .................. 361/816 |
| 6,611,423 B2 * | 8/2003 | Chen ...................... 361/679.02 |
| 6,700,776 B2 * | 3/2004 | Bang et al. .............. 361/679.58 |
| 6,798,652 B2 * | 9/2004 | Wang et al. .............. 361/679.33 |
| 6,816,391 B2 * | 11/2004 | Davis et al. .................. 361/818 |
| 6,819,551 B2 * | 11/2004 | Chen ...................... 361/679.02 |
| 6,873,524 B2 * | 3/2005 | Kaczeus, et al. ......... 361/679.33 |
| 6,909,047 B2 * | 6/2005 | Zhang ........................... 174/50 |
| 7,009,838 B2 * | 3/2006 | Roh ....................... 361/679.32 |
| 7,179,991 B2 * | 2/2007 | Chen et al. ..................... 174/50 |
| 7,265,986 B2 * | 9/2007 | Chen et al. ..................... 361/726 |
| 7,539,010 B2 * | 5/2009 | Chen et al. .............. 361/679.55 |
| 7,540,575 B2 * | 6/2009 | Mau ......................... 312/223.2 |
| 7,558,074 B2 * | 7/2009 | Liang ........................... 361/796 |
| 7,656,653 B2 * | 2/2010 | Li ............................ 361/679.33 |
| 7,708,356 B2 * | 5/2010 | Cheng et al. .............. 312/223.2 |
| 7,735,669 B2 * | 6/2010 | Liang .......................... 220/4.21 |
| 7,961,460 B2 * | 6/2011 | Hood et al. .............. 361/679.55 |
| 2004/0105229 A1 * | 6/2004 | Wang et al. ...................... 361/685 |
| 2007/0217137 A1 * | 9/2007 | Chen et al. ..................... 361/683 |
| 2007/0253159 A1 * | 11/2007 | Lin et al. ........................ 361/687 |
| 2007/0253171 A1 * | 11/2007 | Cheng et al. .................... 361/724 |
| 2007/0281531 A1 * | 12/2007 | Cheng et al. .................... 439/304 |

(Continued)

*Primary Examiner* — Adrian S Wilson

(74) *Attorney, Agent, or Firm* — Muncy, Geissler, Olds & Lowe, PLLC

(57) ABSTRACT

A computer case for installing computer parts such as a motherboard therein is provided. Two casings (including a first casing and a second casing) of the same size, specification and type are assembled opposite to each other to form a complete case. In this way, the manufacturing cost can be greatly saved, and the finished product can be further equipped with panels or baffle plates of different specifications or types according to user requirements, so as to meet the manufacturing requirements for high customization.

8 Claims, 8 Drawing Sheets

(56) References Cited

U.S. PATENT DOCUMENTS

| | | | |
|---|---|---|---|
| 2008/0002346 A1* | 1/2008 | Lin et al. | 361/683 |
| 2008/0225466 A1* | 9/2008 | Carr et al. | 361/600 |
| 2009/0059503 A1* | 3/2009 | Cheng et al. | 361/683 |
| 2010/0133967 A1* | 6/2010 | Cheng et al. | 312/258 |
| 2010/0238624 A1* | 9/2010 | Dai | 361/679.33 |
| 2011/0134598 A1* | 6/2011 | Hsiao | 361/679.33 |

* cited by examiner

COMPUTER CASE

BACKGROUND OF THE UTILITY MODEL

1. Field of the Utility Model

The utility model relates to a computer case for installing electronic components therein, and particularly to a computer case formed by two casings of the same size, specification and type and equipped with panels or baffle plates in response to the requirement for customization.

2. Related Art

Various types of computer mainframes exist, for example, a desktop computer mainframe, for which an overall size of a computer case can be designed according to requirements and specifications of electronic components assembled in the computer case; and a bare system case. FIG. 1 is a schematic three-dimensional outside view of a conventional computer case. Referring to FIG. 1, the computer case 10 is formed by combining a first casing 101 and a second casing 102. Two opposite sides of the second casing 102 respectively extend to form a panel 1021 and a baffle plate 1022 through stamping. Therefore, it can be known from FIG. 1 that, the panel 1021 and the baffle plate 1022 are integrally formed on the second casing 102 directly. An electronic component, for example, a motherboard, is assembled on a plane of the second casing 102, and then the first casing 101 is fitted thereon to obtain a complete computer case. Due to different specifications of the electronic components, for example, connection ports of different specifications are disposed on the motherboards, the types of equipped baffle plates are different, and the types of panels required by manufacturers are also different. However, seen from the above, the panel 1021, the baffle plate 1022, and the second casing 102 are formed at the same time. If the type of the formed panel 1021 or baffle plate 1022 does not meet the specification of the motherboard of the manufacturer, the types of the panel and the baffle plate need to be designed by making a new mould, thereby increasing the cost and labor time. In some computer cases, the first casing and the second casing are respectively formed with the panel and the baffle plate. If the designs of the panel and the baffle plate are both changed, the cost and labor time will be increased. Therefore, it is necessary to improve the computer case.

SUMMARY OF THE UTILITY MODEL

To solve the above problem, the utility model is mainly directed to a computer case, capable of effectively saving the mould cost and meeting the requirement for high customization.

In order to achieve the objective, in the utility model, a single mould is mainly used to manufacture casings of the same size, specification and type. The casings are assembled opposite to each other to form a computer case. A front end and a rear end of the assembled computer case are provided to dispose a panel or a baffle plate of a corresponding size, respectively. An overall appearance of the computer case may be equipped with the panels or baffle plates of different types for assembly, so as to meet the requirement for high customization. Therefore, in the utility model, the same mould is used to manufacture the main body of the computer case, thereby effectively reducing the manufacturing cost. Moreover, different panels or baffle plates are equipped in response to the requirement for customization, which also meets the characteristic of small volume but large-variety production, thereby achieving the purpose of saving the cost and reducing the labor time.

The description of the content of the utility model and the following embodiment is intended to demonstrate and explain the spirit and principle of the utility model, and provide further explanation of the scope of the utility model.

BRIEF DESCRIPTION OF THE DRAWINGS

The utility model will become more fully understood from the detailed description given herein below for illustration only, and thus are not limitative of the utility model, and wherein.

DETAILED DESCRIPTION OF THE UTILITY MODEL

Figure 1:
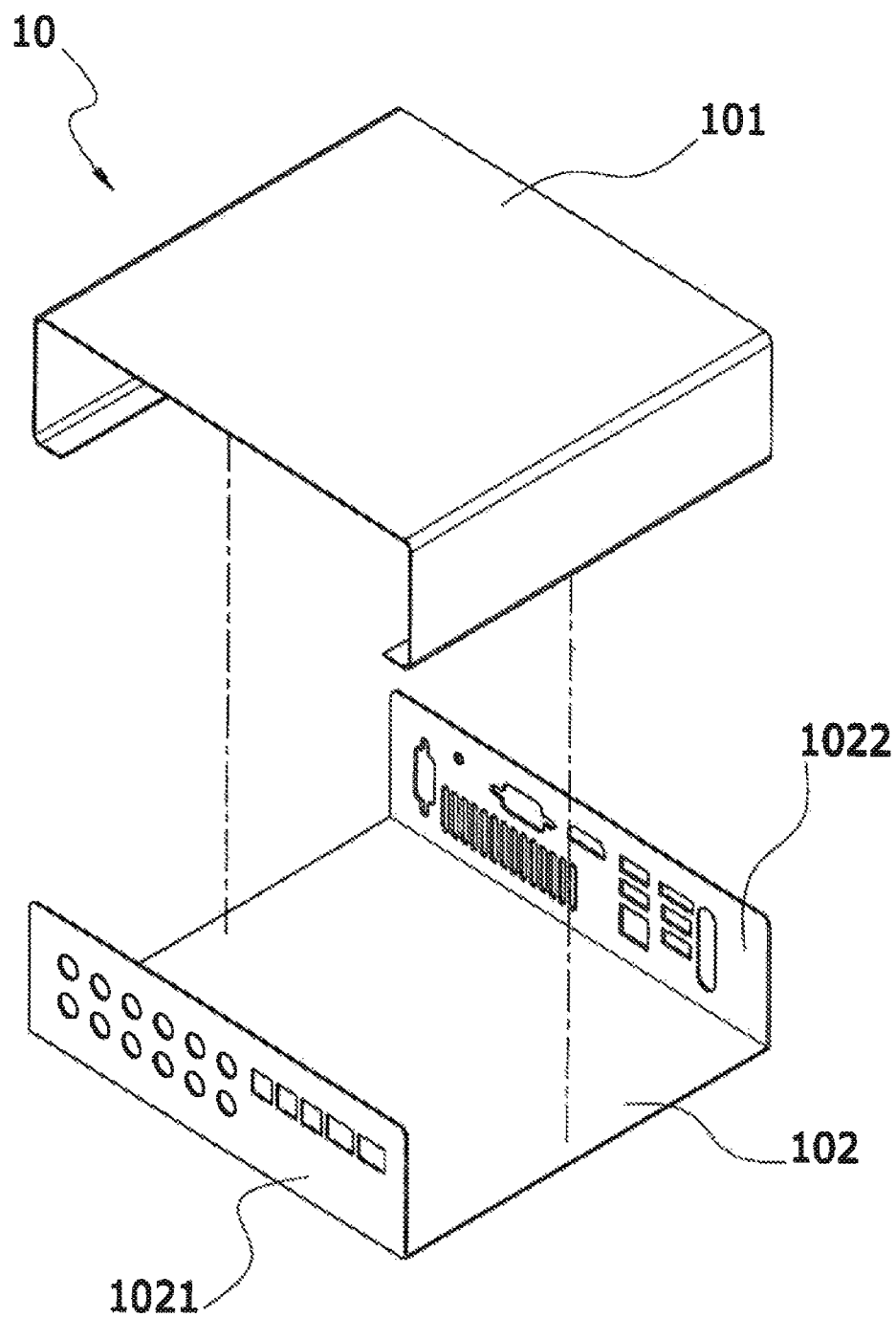
FIG. 1 is a schematic three-dimensional outside view of a conventional computer case.
Figure 2:
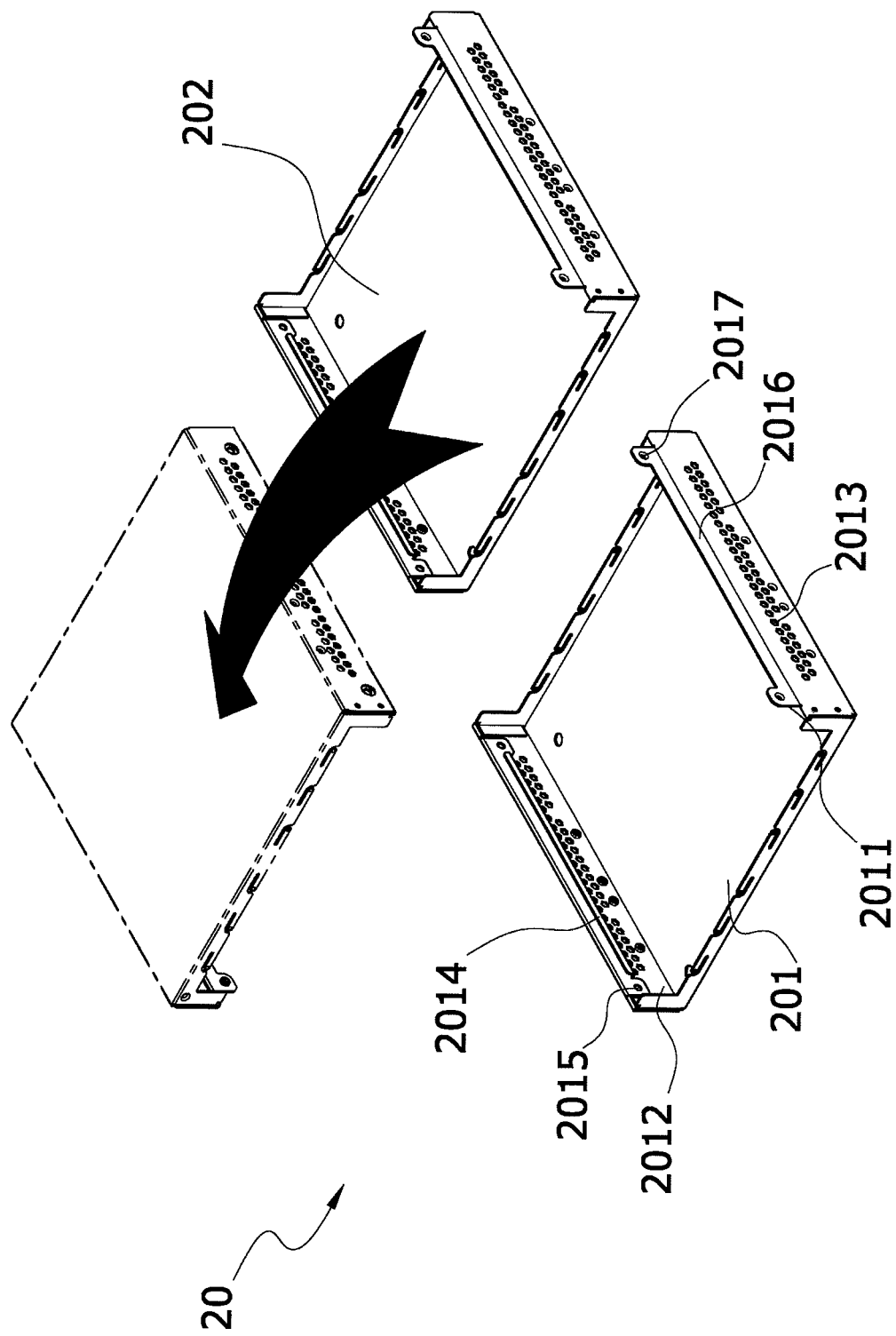
FIG. 2 is a schematic structural view of members of the utility model.
Figure 3:
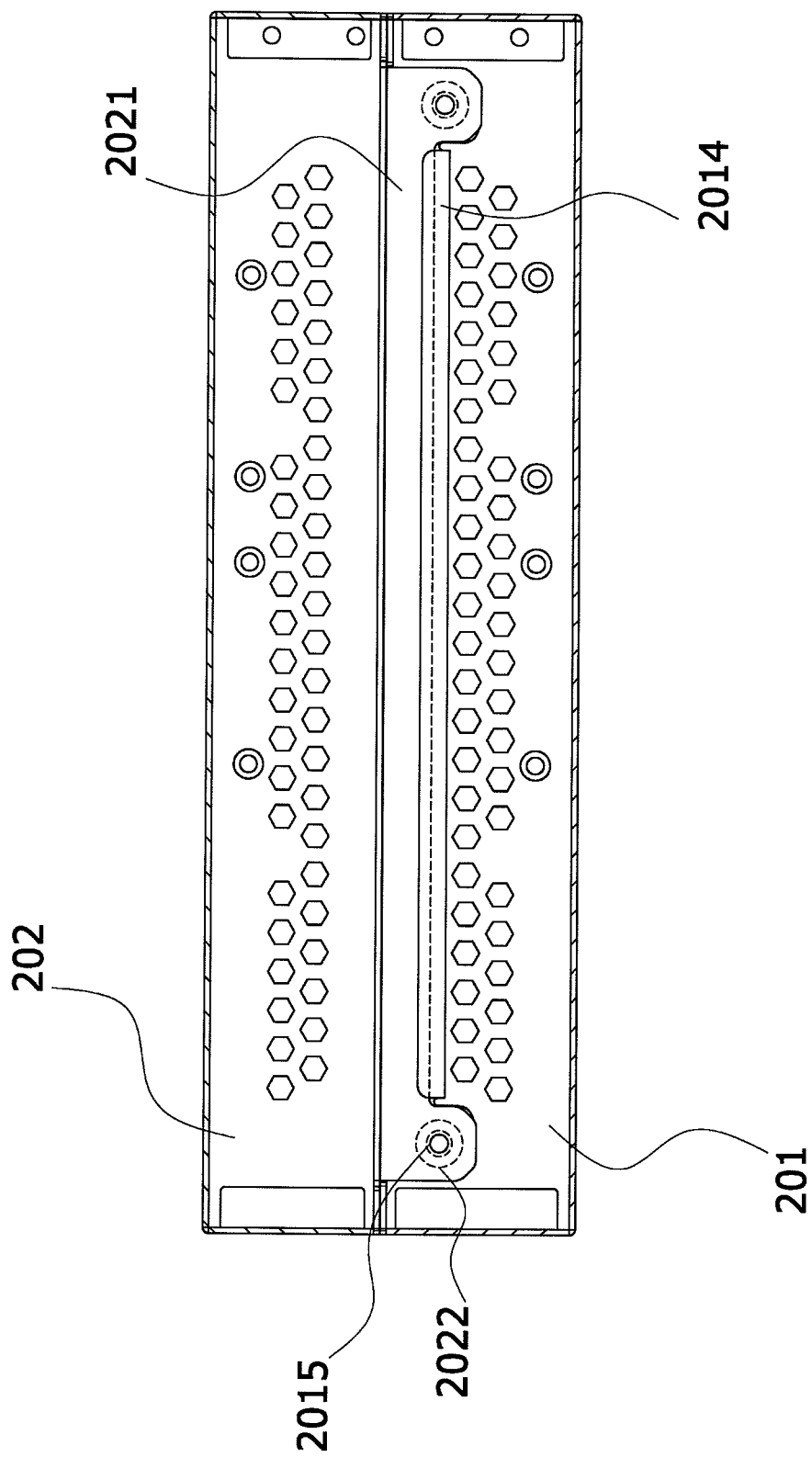
FIG. 3 is a schematic view of assembly of the utility model.
Figure 4:
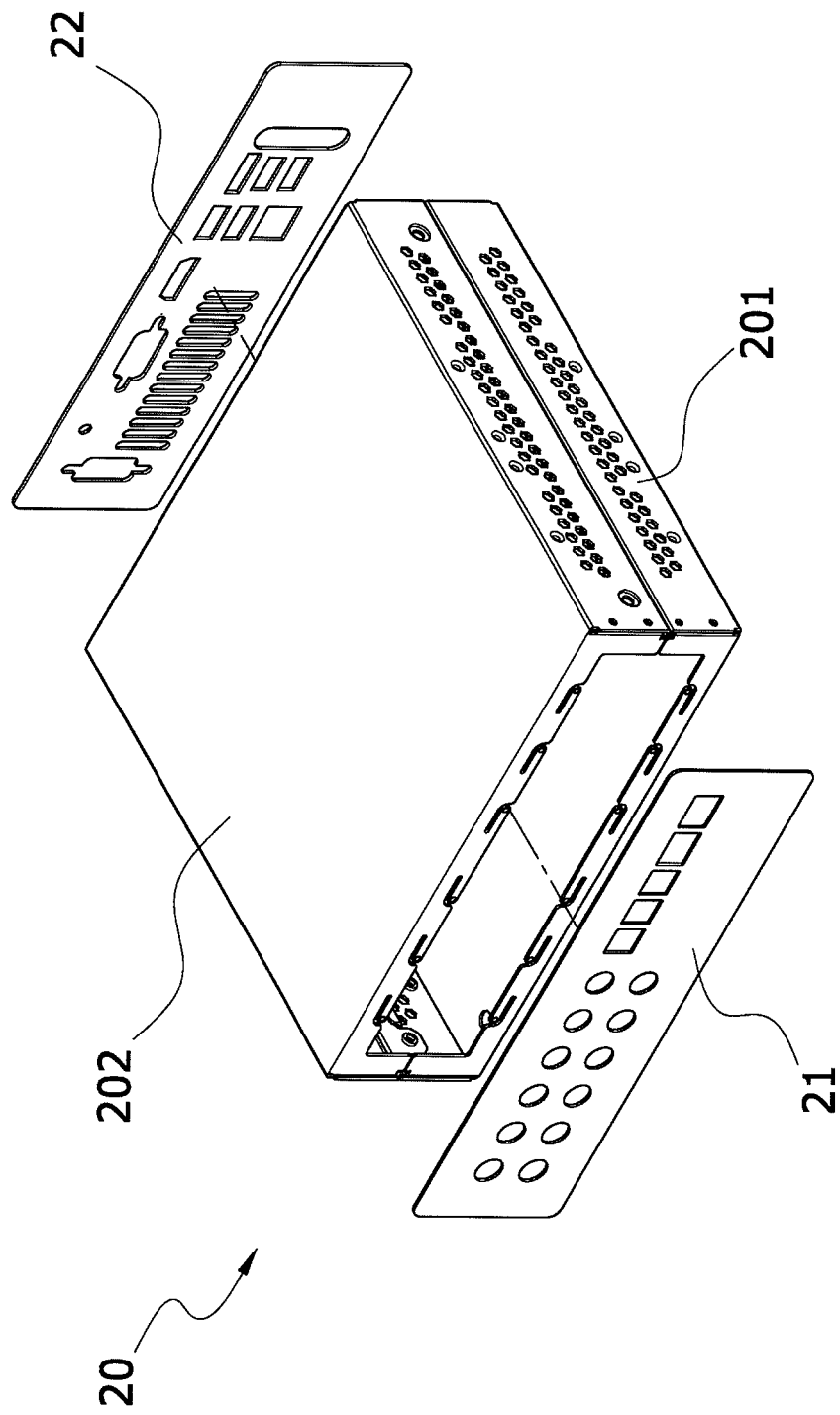
FIG. 4 is a schematic view of completed combination of the utility model.

FIG. 2 is a schematic structural view of members of the utility model. Referring to FIG. 2, a computer case 20 is mainly formed by combining a first casing 201 and a second casing 202. The first casing 201 and the second casing 202 are casings of the same size, specification and type. Two sides of the first casing 201 are respectively bent opposite to each other to form a first baffle wall 2011 and a second baffle wall 2012. A plurality of heat dissipation holes 2013 is formed on planes of the two baffle walls (2011, 2012) respectively. A leaning portion 2014 is disposed at an inner side of the first baffle wall 2011. The so-called leaning portion 2014 is of a groove shape. A screw hole 2015 is respectively formed on two sides of the leaning portion 2014. A positioning portion 2016 is formed on a top edge of the second baffle wall 2012. Opposite screw holes 2017 are formed on the positioning portion 2016 relative to the screw holes 2015. The construction of the second casing 202 is the same as that of the first casing 201, and the details will not be described herein. During assembly of the utility model, the first casing 201 is placed on a plane in advance, and then the second casing 202 is covered over the first casing 201. FIG. 3 is a schematic view of assembly of the utility model. Referring to FIG. 2, when the second casing 202 is covered over the first casing 201, a positioning portion 2021 of the second casing 202 further leans against an inner portion of the leaning portion 2014 of the first casing 201, opposite screw holes 2022 of the positioning portion 2021 are relative to the screw holes 2015 of the leaning portion 2014, and a screw passes through each screw hole 2015 and the corresponding opposite screw hole 2022 to complete locking, so that the first casing 201 and the second casing 202 are fixed. The other sides of the two casings (201, 202) are combined using the same manner. The members are combined as shown in FIG. 4, which is a schematic view of completed combination of the utility model. After the first casing 201 and the second casing 202 are assembled, that is, the computer case 20 is completed, as shown in FIG. 4, different types of panels 21 or baffle plates 22 may be equipped according to user requirements with no need to manufacture the case again by making a new mould, thereby effectively saving the cost and the labor time.

Figure 5:
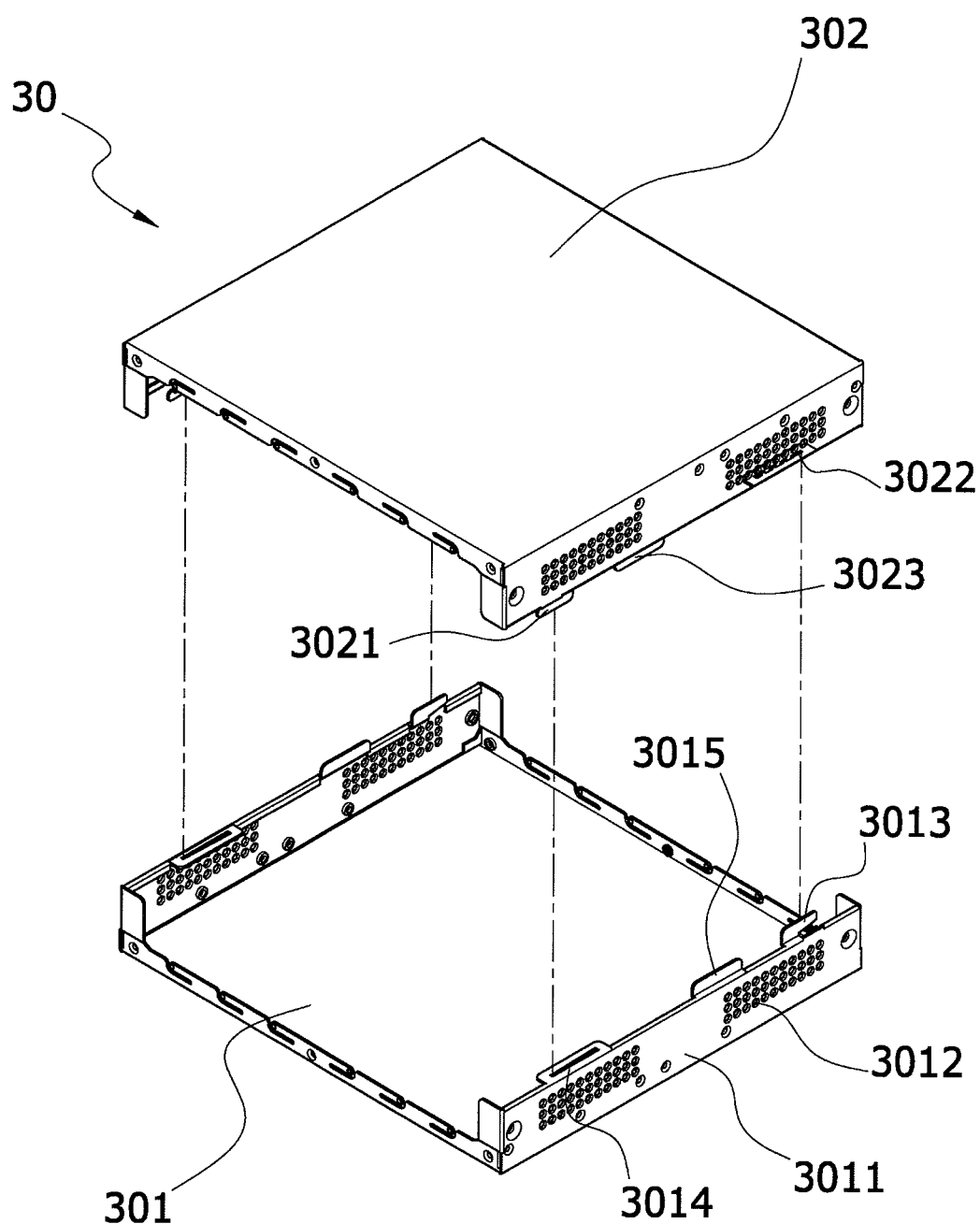
FIG. 5 shows another embodiment (1) of the utility model.

FIG. 5 shows another embodiment (1) of the utility model. As shown in FIG. 5, a computer case 30 is formed by combining a first casing 301 and a second casing 302. Two sides of the first casing 301 are respectively bent to form a baffle wall 3011. A plurality of heat dissipation holes 3012 is formed on a plane of the baffle wall 3011. A snapping portion 3013, an opposite snapping portion 3014, and a leaning portion 3015 are formed on a top edge of the baffle wall 3011. An overall structure of the second casing 302 is the same as that of the first casing 301, and the details will not be described herein. When the first casing 301 and the second casing 302 are combined, a snapping portion 3021 of the second casing 302 is snapped with the opposite snapping portion 3014 of the first casing 301, an opposite snapping portion 3022 of the second casing 302 is snapped with the snapping portion 3013 of the first casing 301, and under the stabilizing effect of the leaning portions (3015, 3023), the combination of the two casings (301, 302) is completed to form the computer case 30.

Figure 6:
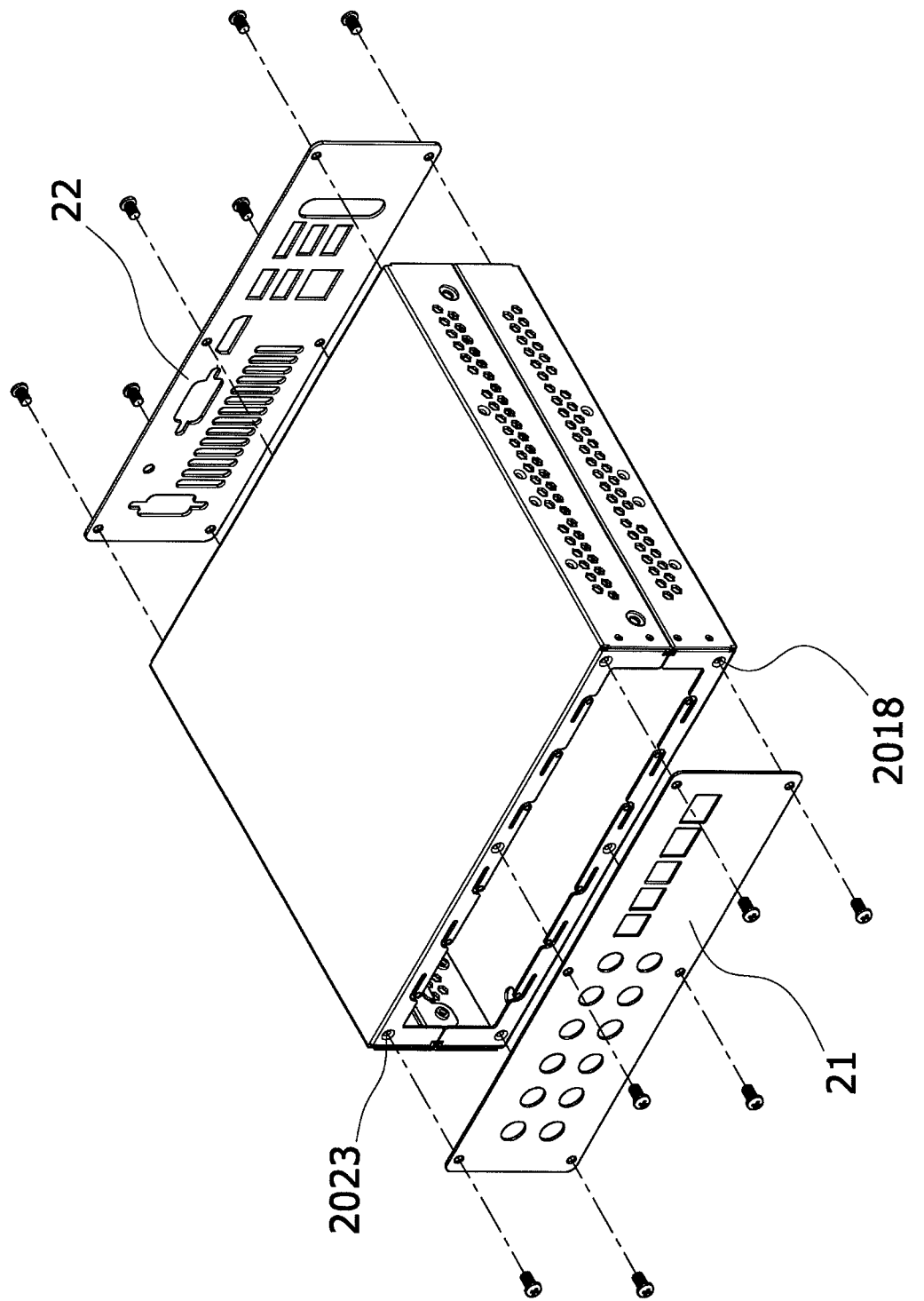
FIG. 6 shows another embodiment (2) of the utility model.

FIG. 6 shows another embodiment (2) of the utility model. Referring to FIG. 6, in order to increase the stability of the panel 21 and the baffle plate 22, in the utility model, a plurality of screw holes (2018, 2023) is formed on disposition surfaces of the first casing 201 and the second casing 202 relative to the panel 21 and the baffle plate 22, and a plurality of screws passes through the panel 21 or the baffle plate 22 to be locked in the screw holes (2018, 2023), so as to enhance the stability.

Figure 7:
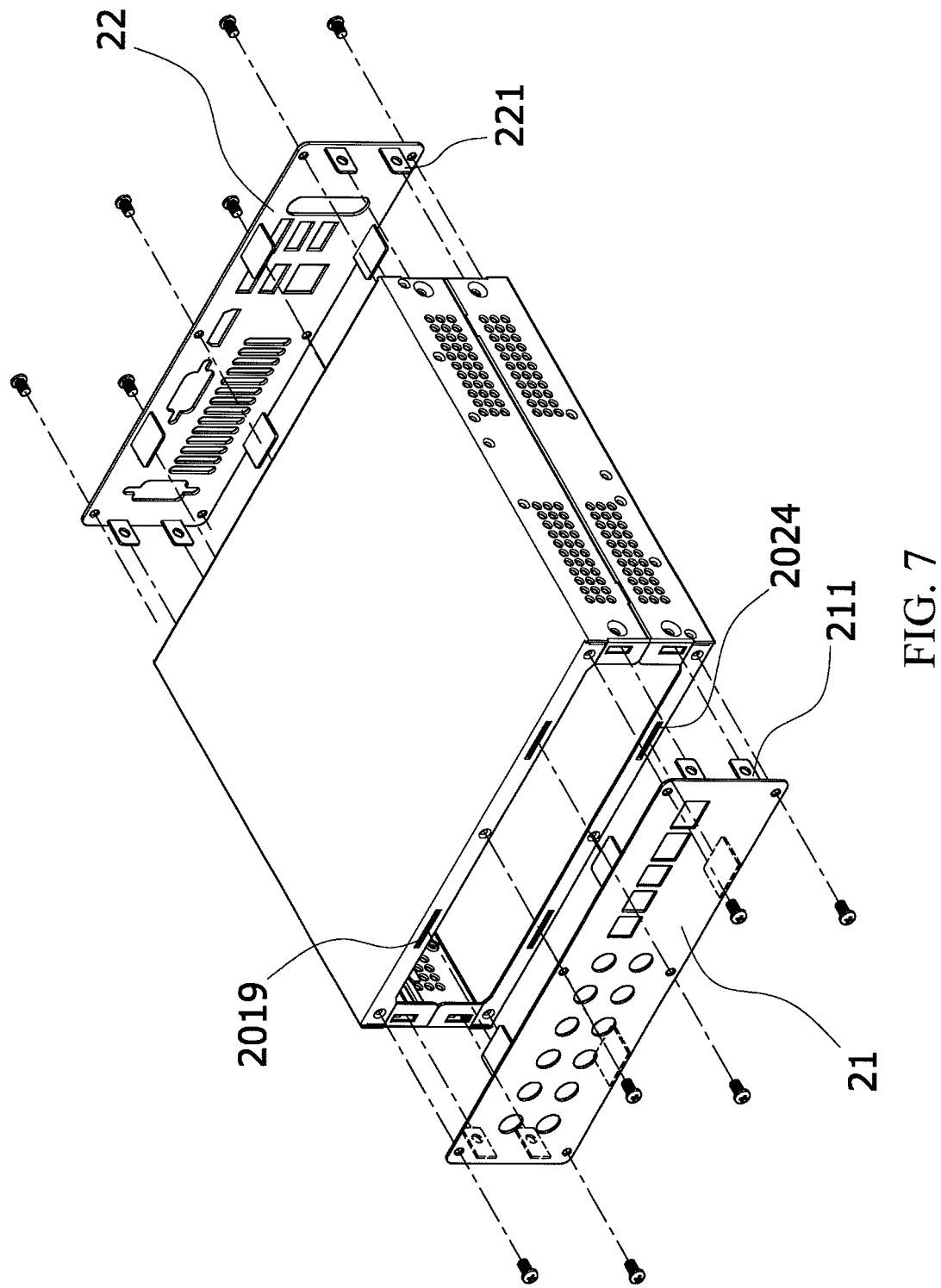
FIG. 7 shows another embodiment (3) of the utility model.

FIG. 7 shows another embodiment (3) of the utility model. Referring to FIG. 7, in the utility model, ribs (211, 221) are respectively disposed on planes of the panel 21 and the baffle plate 22, and through holes (2019, 2024) are respectively formed on the opposite disposition surfaces of the two casings (201, 202), so that after the panel 21 or the baffle plate 22 is locked in the computer case 20, the ribs (211, 221) may be inserted into the through holes (2019, 2024) to enhance the fixing effect.

Figure 8:
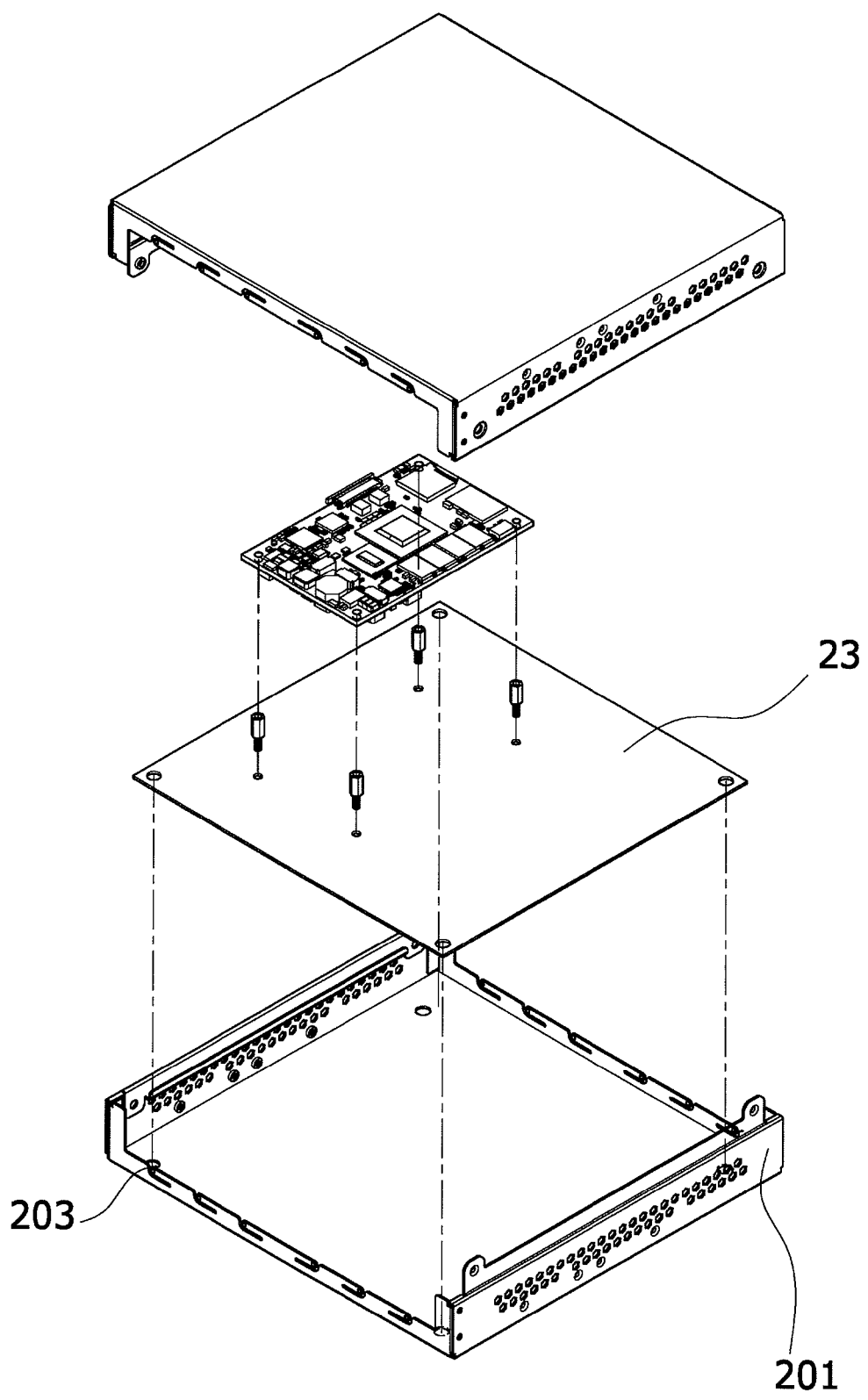
FIG. 8 shows another embodiment (4) of the utility model.

FIG. 8 shows another embodiment (4) of the utility model. Referring to FIG. 8, a plurality of disposition holes 203 is formed on a bottom plane of the first casing 201. A plurality of screws passes through a carrying plate 23, and assembles the carrying plate 23 on the disposition holes 203. Therefore, the carrying plate 23 is fixed to the bottom of the first casing 201 in a normal state. An electronic component such as a motherboard can be locked on a plane of the carrying plate 23.

After the computer case of the utility model is assembled, a required panel or baffle plate can be equipped according to user requirements on the type or specification of the panel or the baffle plate. If the panel or the baffle plate is manufactured by making a new mould, the computer case does not need to be manufactured again. Therefore, according to the utility model, a computer case capable of effectively saving the cost and labor time is provided.

The above descriptions are merely preferred embodiments of the utility model, but are not intended to limit the utility model. Any modification, equivalent replacement, or improvement made by persons skilled in the art without departing from the spirit and scope of the utility model shall fall within the appended claims of the utility model.

To sum up, the utility model satisfies the patent requirements of industrial applicability, novelty and inventive step, so that the present application is filed for a utility model patent according to the provisions of the Patent Act.

LIST OF REFERENCE NUMERALS

| | |
|---|---|
| 10 | Computer case |
| 101 | First casing |
| 102 | Second casing |
| 1021 | Panel |
| 1022 | Baffle plate |
| 20 | Computer case |
| 201 | First casing |
| 2011 | Baffle wall |
| 2012 | Baffle wall |
| 2013 | Heat dissipation hole |
| 2014 | Leaning portion |
| 2015 | Screw hole |
| 2016 | Positioning portion |
| 2017 | Opposite screw hole |
| 2018 | Screw hole |
| 2019 | Through hole |
| 202 | Second casing |
| 2021 | Positioning portion |
| 2022 | Opposite screw hole |
| 2023 | Screw hole |
| 2024 | Through hole |
| 203 | Disposition hole |
| 21 | Panel |
| 211 | Rib |
| 22 | Baffle plate |
| 221 | Rib |
| 23 | Carrying plate |
| 30 | Computer case |
| 301 | First casing |
| 3011 | Baffle wall |
| 3012 | Baffle wall |
| 3013 | Snapping portion |
| 3014 | Opposite snapping portion |
| 3015 | Leaning portion |
| 302 | Second casing |
| 3021 | Snapping portion |
| 3022 | Opposite snapping portion |
| 3023 | Leaning portion |

What is claimed is:

1. A computer case, for installing a computer motherboard therein, comprising:
   a first casing, wherein two sides of the first casing are respectively bent to form a baffle wall, a plurality of heat dissipation holes is formed on a plane of the baffle wall, a leaning portion is disposed at an inner side of one of the baffle walls, a plurality of screw holes is formed near the leaning portion, a positioning portion is disposed at an inner side of the other baffle wall, and a plurality of opposite screw holes is formed on the positioning portion relative to the screw holes; and
   a second casing, wherein the second casing is covered over the first casing, and accordingly, a positioning portion of the second casing leans against the leaning portion of the first casing, the positioning portion of the first casing leans against a leaning portion of the second casing, and a screw passes through each screw hole and the corresponding opposite screw hole to complete locking of the two casings,
   wherein the first casing and the second casing have the same size, shape, and structure.

2. The computer case according to claim 1, wherein after the first casing and the second casing are assembled, one end is provided for disposing a panel, and the other end is provided for disposing a baffle plate.

3. The computer case according to claim 2, wherein a plurality of screw holes is formed on disposition surfaces of the first casing and the second casing relative to the panel and the baffle plate.

4. The computer case according to claim 3, wherein a plurality of through holes is formed on the disposition surface.

5. The computer case according to claim 4, wherein a rib formed on the panel and the baffle plate is inserted in the through hole.

6. The computer case according to claim 1, wherein a plurality of disposition holes is formed on a bottom plane of the first casing, and is provided for a carrying plate to complete locking through a plurality of screws.

7. A computer case, comprising:
   a first casing, wherein two sides of the first casing are respectively bent to form a baffle wall, a plurality of heat dissipation holes is formed on a plane of the baffle wall, and a snapping portion and an opposite snapping portion are formed on a top edge of the baffle wall; and
   a second casing, wherein the second casing is covered over the first casing, and accordingly, a snapping portion of the second casing is snapped with the opposite snapping portion of the first casing, and the snapping portion of the first casing is snapped with an opposite snapping portion of the second casing, so as to complete combination of the two casings,
   wherein the first casing and the second casing have the same size, shape, and structure.

8. The computer case according to claim 7, wherein a leaning portion is respectively formed on top edges of the two casings.

\* \* \* \* \*